(12) United States Patent
Marupaduga (10) Patent No.: US 9,143,303 B1
(45) Date of Patent: Sep. 22, 2015

(54) CARRIER AGGREGATION ACROSS MULTIPLE FREQUENCY BANDS

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 100 days.

(21) Appl. No.: 14/065,936

(22) Filed: Oct. 29, 2013

(51) Int. Cl.
| | |
|---|---|
| H04W 4/00 | (2009.01) |
| H04W 72/14 | (2009.01) |
| H04L 5/00 | (2006.01) |
| H04W 72/04 | (2009.01) |
| H04L 5/14 | (2006.01) |

(52) U.S. Cl.
CPC ......... H04L 5/0092 (2013.01); H04W 72/0406 (2013.01); *H04L 5/14* (2013.01)

(58) Field of Classification Search
None
See application file for complete search history.

(56) References Cited

U.S. PATENT DOCUMENTS

| | | | |
|---|---|---|---|
| 2012/0087257 A1* | 4/2012 | Larsson et al. | 370/252 |
| 2013/0044621 A1 | 2/2013 | Jung et al. | |
| 2013/0044791 A1 | 2/2013 | Rimini et al. | |
| 2013/0114505 A1* | 5/2013 | Haim et al. | 370/328 |
| 2013/0150054 A1* | 6/2013 | Axmon et al. | 455/440 |
| 2014/0055210 A1* | 2/2014 | Black et al. | 333/132 |
| 2014/0092786 A1* | 4/2014 | HE et al. | 370/329 |
| 2015/0049653 A1* | 2/2015 | Baghel et al. | 370/280 |
| 2015/0063143 A1* | 3/2015 | Toskala et al. | 370/252 |
| 2015/0087245 A1* | 3/2015 | Hadji-Abdolhamid et al. | 455/77 |

* cited by examiner

*Primary Examiner* — Chi H Pham
*Assistant Examiner* — Soon-Dong D Hyun (57) ABSTRACT

Examples disclosed herein provide systems, methods, and software for carrier aggregation. In one instance, a method of operating a wireless communication system that uses multiple frequency bands to control carrier aggregation includes monitoring intermodulation distortion in orthogonal frequency division multiplexing frequencies for each of the frequency bands, and receiving a communication service request for a wireless communication device. If the communication service request is Voice over Long Term Evolution (VoLTE), the method will schedule the wireless communication device to use intra-band contiguous carrier aggregation. If the communication service request is not VoLTE, and the intermodulation distortion is below a distortion threshold, the method will schedule the wireless communication device to use intra-band non-contiguous carrier aggregation. Finally, if the communication service request is not VoLTE, and the intermodulation distortion is above the distortion threshold, the method will scheduler the wireless communication device to use inter-band non-contiguous carrier aggregation.

20 Claims, 5 Drawing Sheets

CARRIER AGGREGATION ACROSS MULTIPLE FREQUENCY BANDS

TECHNICAL BACKGROUND

Wireless communication networks are responsible for managing a variety of wireless devices that require a variety of communications. Not only must these networks manage the movement of the devices as the devices move from one location to another, but they must also maintain appropriate scheduling to provide the appropriate data to the devices. Typically, this scheduling includes dividing the network both in frequency and in time to allocate resource blocks for the individual wireless devices.

In some examples, a wireless communication system may employ carrier aggregation. Carrier aggregation allows Long Term Evolution (LTE) networks to increase bandwidth, and thereby increase bitrates. This increase in bandwidth allows the network to provide a user with a greater amount of data over a shorter period of time. In practice to provide this increase in bandwidth, carrier aggregation may be applied in a variety of ways. One such way that carrier aggregation may be applied is through intra-band, contiguous aggregation that uses contiguous component carriers within the same operating frequency band. An alternative aggregation includes intra-band, non-contiguous aggregation that spaces the component carriers within the same operating frequency band. Finally, in situations where the network includes multiple frequency bands, the scheduler may employ inter-band, non-contiguous aggregation, which spaces the component carriers across the multiple frequency bands.

Overview

Examples disclosed herein provide systems, methods, and software for carrier aggregation. In one instance, a method of operating a wireless communication system that uses multiple frequency bands to control carrier aggregation includes monitoring intermodulation distortion in orthogonal frequency division multiplexing frequencies for each of the frequency bands, and receiving a communication service request for a wireless communication device. If the communication service request is Voice over Long Term Evolution (VoLTE), the method will schedule the wireless communication device to use intra-band contiguous carrier aggregation. If the communication service request is not VoLTE, and the intermodulation distortion is below a distortion threshold, the method will schedule the wireless communication device to use intra-band non-contiguous carrier aggregation. Finally, if the communication service request is not VoLTE, and the intermodulation distortion is above a distortion threshold, the method will scheduler the wireless communication device to use inter-band non-contiguous carrier aggregation.

In another example, a computer apparatus to facilitate carrier aggregation includes processing instructions that direct a scheduling computing system to monitor intermodulation distortion in orthogonal frequency division multiplexing frequencies for each of a plurality of frequency bands, and receive a communication service request for a wireless communication device. The instructions further direct the computing system to, if the communication service request is Voice over Long Term Evolution (VoLTE), schedule the wireless communication device to use intra-band contiguous carrier aggregation. The instructions also direct the computing system to, if the communication service request is not VoLTE and the intermodulation distortion is below a distortion threshold, schedule the wireless communication device to use intra-band non-contiguous carrier aggregation. The instructions further direct the computing system to, if the communication service request is not VoLTE, and the intermodulation distortion is above a distortion threshold, schedule the wireless communication device to use inter-band non-contiguous carrier aggregation.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
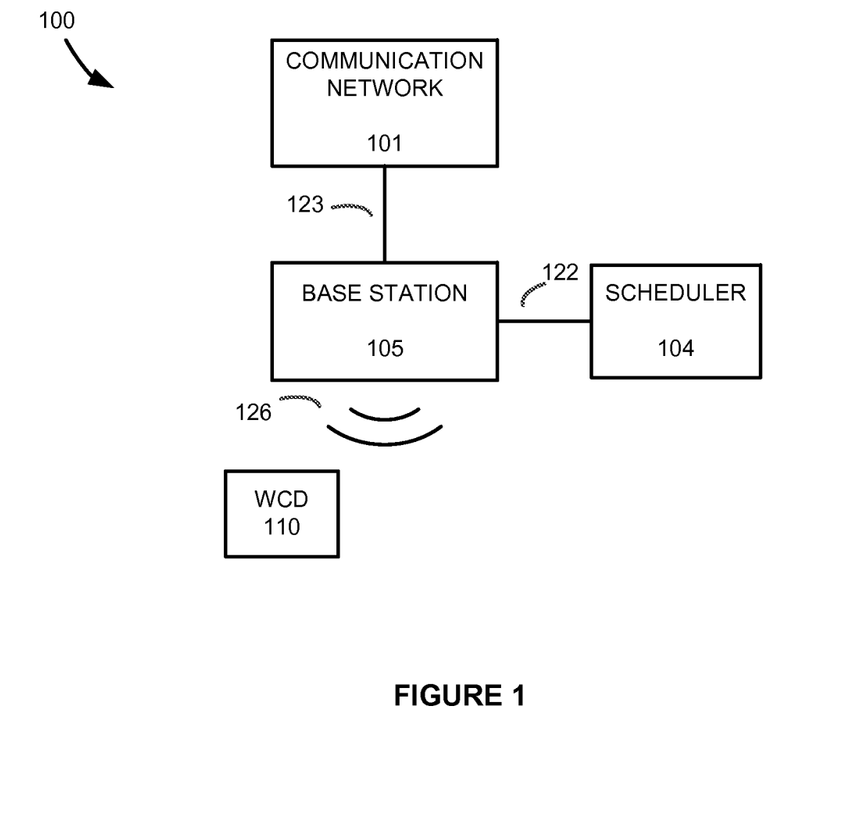
FIG. 1 illustrates a wireless communication system capable of controlling carrier aggregation.

FIG. 1 illustrates a wireless communication system 100 for controlling carrier aggregation. Wireless communication system 100 includes communication network 101, scheduler 104, base station 105, and wireless communication device (WCD) 110. Communication network 101 communicates with base station 105 over communication link 123, and base station 105 further communicates with scheduler 104 over communication link 122. Wireless communication device 110 communicates with base station 105 using wireless signals 126.

In operation, wireless communication device 110 may require data either for an application on the device or for voice communication. Base station 105 is configured to service these requests using Long Term Evolution (LTE) wireless service provided over communication link 126. When data is required for wireless communication device 110, scheduler 104 will provide at least one frequency and time slot for the data to be either sent or received from the device. In the present example, scheduler 104 is configured to also allow and control carrier aggregation. Carrier aggregation allows an increase in bandwidth of data communicated with wireless communication device 110. Thus, if a data communication required more bandwidth, then carrier aggregation could be used to increase the bit rate to the wireless device.

Some data communications that take place with a wireless communication device include application specific communications, such as uploading and downloading movies, texts, webpages, and the like, and voice communications, such as Voice over LTE or VoLTE. Unlike previous cellular telecommunication standards, LTE does not have dedicated channels for circuit switched telephony. As a result, the voice calls on the LTE network must be handled in a similar way to the other data requests, but may require carrier aggregation to provide the proper bandwidth for the call.

Figure 2:
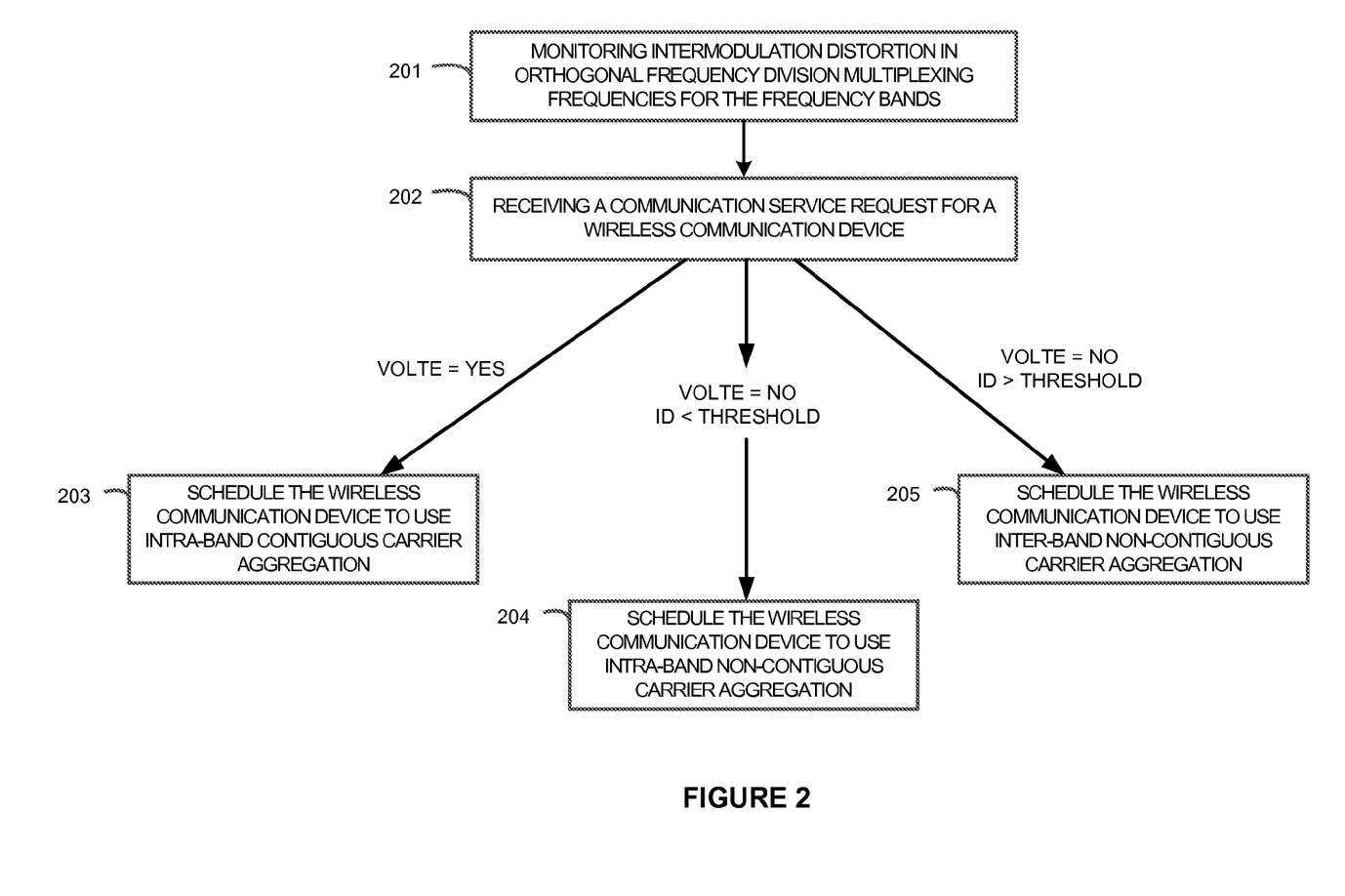
FIG. 2 illustrates a method of operating a wireless communication system that uses multiple frequency bands to control carrier aggregation.

To better illustrate the operation of wireless communication system 100, FIG. 2 is provided to demonstrate a method of using carrier aggregation with multiple frequency bands. The method includes, monitoring intermodulation distortion in orthogonal frequency division multiplexing frequencies for each of the frequency bands (201). Intermodulation distortion is the amplitude modulation of signals containing two or more different frequencies in a system with nonlinearities. The distortion may occur due to contaminated surfaces or contacts due to dirt, dust, moisture, or oxidation, may occur because of lose mechanical junctions, may occur because of metal flakes or shaves in RF connections, or may occur for any other similar reason. The intermodulation of each frequency component will form additional signals at frequencies that are not just harmonic frequencies. As a result, intermodulation is not desirable in an LTE communication network, as it creates unwanted emissions, often in the form of sidebands. By monitoring the amplitude modulation, communication system 100 may more quickly react to the distortion to provide better service to the end user.

In addition to monitoring the intermodulation distortion, the method further provides receiving a communication service request for wireless communication device 110 (202). Such a service request may be initiated by wireless communication device 110, or may be initiated externally by a request from communication network 101. The request may include a request for data to be supplied to wireless communication device 110, a request to send data from wireless communication device 110 to some other device, a request for a VoLTE communication, or any other similar request.

Following the request, scheduler 104, which may reside on base station 105 in some examples, will provide carrier aggregation for the request. If the request is for a VoLTE communication, scheduler 104 will schedule wireless communication device 110 to use intra-band contiguous carrier aggregation (203). Intra-band contiguous carrier aggregation arranges for the communication to be carried out using contiguous component carriers within the same frequency band. Thus, for example, if a frequency band were divided into ten separate frequencies using orthogonal frequency division multiplexing, then scheduler 104 could assign the wireless communication device frequencies that were adjacent to one another.

In the alternative, if the communication is not a VoLTE request, scheduler 104 may handle the carrier aggregation in one of two ways based on a threshold intermodulation distortion, which may be generated by an administrator, a software module on scheduler 104, or any other method of generating the threshold. In situations where intermodulation distortion for the available frequencies falls below the threshold, scheduler 104 will schedule wireless communication device 110 to use intra-band non-contiguous carrier aggregation (204). This would allow the communication to be communicated using the same frequency band, but would not allow the communication in adjacent frequencies. In contrast, if the intermodulation distortion rises above the threshold, scheduler 104 will schedule wireless communication device 110 to use inter-band non-contiguous carrier aggregation (205). By providing the device with inter-band communication, scheduler 104 will attempt to mitigate the effect caused by the distortion. Essentially separating the communication out between the bands to prevent interference in the communication.

Returning to FIG. 1, communication network 101 comprises network elements that provide communications services to wireless communication device 110 through base station 105. Communication network 101 may comprise switches, wireless access nodes, Internet routers, network gateways, application servers, computer systems, communication links, or some other type of communication equipment—including combinations thereof.

Base station 105 comprises Radio Frequency (RF) communication circuitry and an antenna. The RF communication circuitry typically includes an amplifier, filter, RF modulator, and signal processing circuitry. Base station 105 may also comprise a router, server, memory device, software, processing circuitry, cabling, power supply, network communication interface, structural support, or some other communication apparatus. Base station 105 may be an eNodeB in some examples configured to communicate with wireless communication device 110 using LTE communication format.

Scheduler 104 may comprise any computer system capable of scheduling communications using carrier aggregation. Scheduler 104 may include a user interface, memory device, software, processing circuitry, or some other communication components that communicate with base station 105. Although illustrated separate from base station 105 for clarity, it should be understood that scheduler 104 may reside wholly or partially on base station 105.

Wireless communication device 110 comprises RF communication circuitry and an antenna. The RF communication circuitry typically includes an amplifier, filter, modulator, and signal processing circuitry. Wireless communication device 110 may also include a user interface, memory device, software, processing circuitry, or some other communication components. Wireless communication device 110 may be a telephone, computer, e-book, mobile Internet appliance, wireless network interface card, media player, game console, or some other wireless communication apparatus—including combinations thereof.

Wireless sector 126 includes wireless links that use the air or space as a transport media. In the present example wireless sector 126 is configured to communicate between base station 105 and wireless communication device 110 using LTE communication format. Communication links 122-123 use metal, glass, air, space, or some other material as the transport media. Communication links 122-123 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 122-123 could be direct links or may include intermediate networks, systems, or devices.

Figure 3:
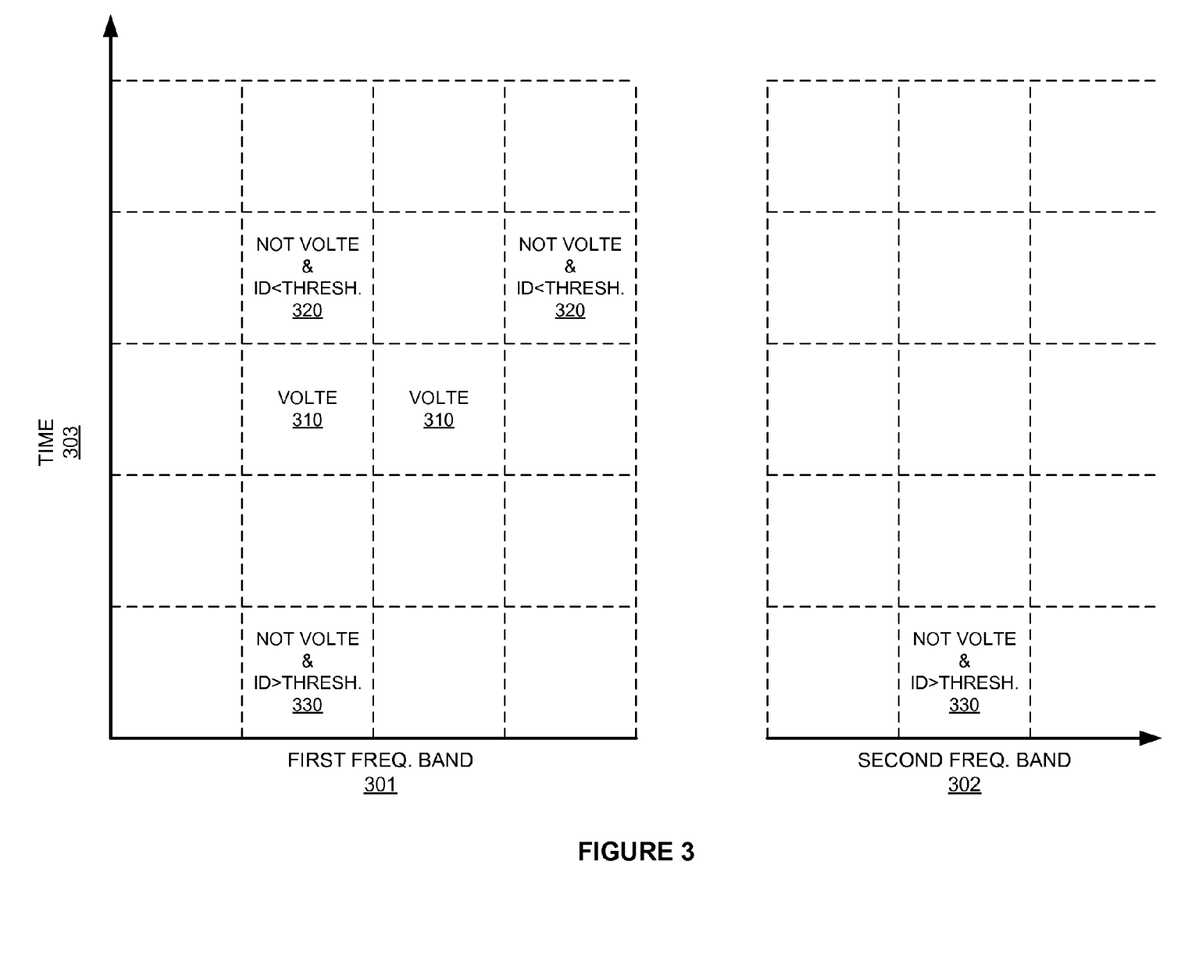
FIG. 3 illustrates a scheduling diagram for multiple frequency bands.

FIG. 3 illustrates a scheduling diagram for multiple frequency bands. FIG. 3 includes first frequency band 301, second frequency band 302, and time 303, which together form resource or timing blocks for wireless communication with a wireless communication device. In operation, a communication service request may be received for a wireless communication device. Such a request may include a request to provide VoLTE to the device, a request to send data for an application on the device, a request to receive data for an application on the device, or any other similar request.

Once the request is received, a scheduling mechanism, such as scheduler 104, will classify the request into one of three different classes. These classifications include intra-band contiguous carrier aggregation that allows multiple adjacent component carriers to be used for the communication, intra-band non-contiguous carrier aggregation that allows non-adjacent component carriers in the same frequency band to be used for the communication, and inter-band non-contiguous carrier aggregation that uses multiple frequencies across multiple frequency bands.

In the present example, communications for a wireless device are divided between VoLTE communication requests and all other communication requests. If the scheduler determines that the request is VoLTE, the scheduler will schedule the device to use intra-band contiguous carrier aggregation, which is illustrated in FIG. 3 as volte communication 310. If, however, the communication request is for a non-VoLTE communication, then the scheduler may implement the communication using either intra-band non-contiguous carrier aggregation or inter-band non-contiguous carrier aggregation.

To distinguish between these two non-contiguous carrier aggregation methods, the scheduler will determine the amount of intermodulation distortion between the base station and the wireless communication device. Intermodulation distortion is the amplitude modulation of signals containing two or more different frequencies in a system with nonlinearities, and can be caused by contaminated surfaces with rust or dust, loose junctions, or impurities within the RF connectors, among other possible conditions. Here, the intermodulation distortion between the base station and the wireless device will be measured and assigned a value. This value may then be compared to a threshold, which may be decibels or any other measurement method of distortion, to determine whether the communication should use intra-band communications or inter-band communications. If the intermodulation distortion value is found to be below the threshold, then the scheduler will schedule the communication using intra-band non-contiguous carrier aggregation, as illustrated in FIG. 3 as scheduled blocks 320. In contrast, if the intermodulation distortion value is found to be greater than the threshold, then the scheduler will schedule using inter-band non-contiguous carrier aggregation, as illustrated by scheduled blocks 330. By separating the communication across multiple frequency bands, the goal is to reduce the amount of interference that may have resulted if the communication was accomplished using a single band.

Figure 4:
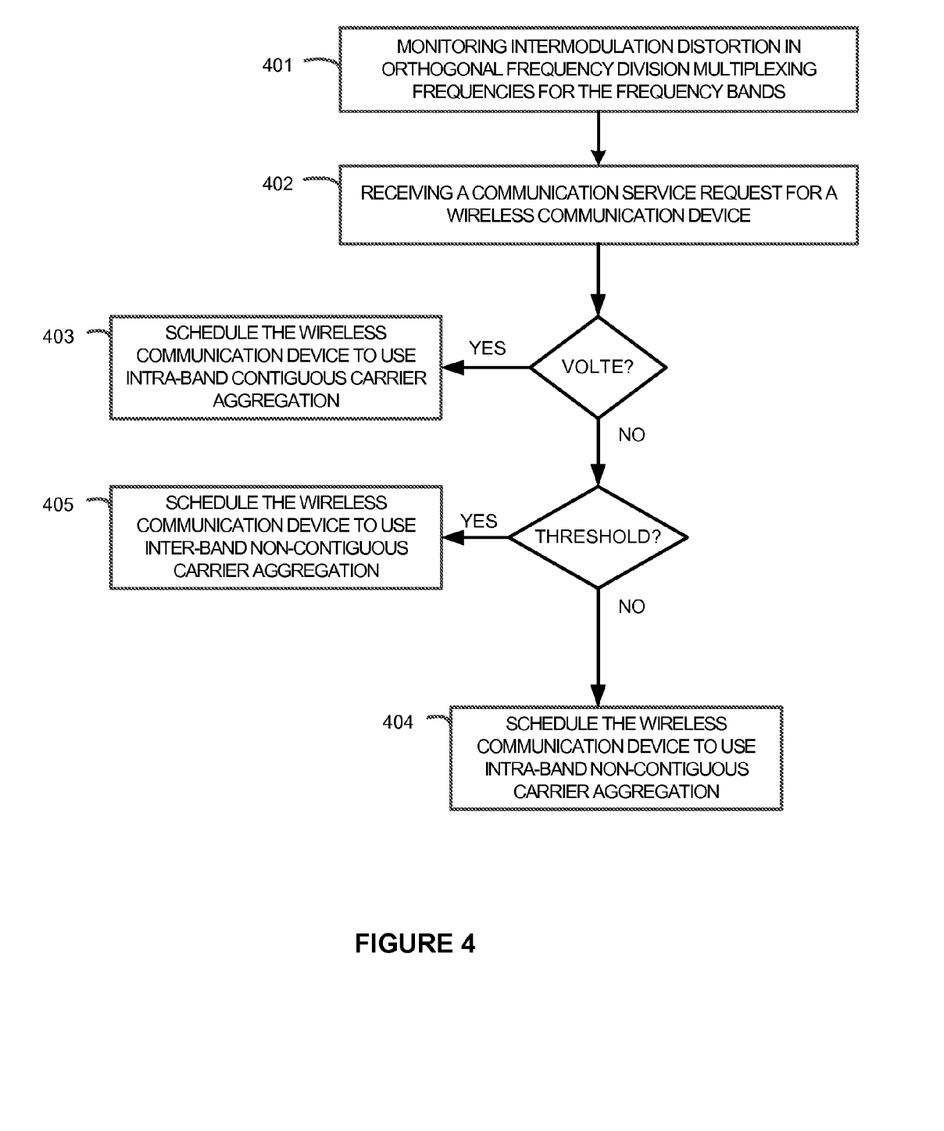
FIG. 4 illustrates a flow diagram for operating a wireless communication system using carrier aggregation.

FIG. 4 illustrates a flow diagram for scheduling using carrier aggregation. The method includes monitoring intermodulation distortion in orthogonal frequency division multiplexing frequencies for each of the frequency bands (401). Intermodulation distortion can be caused by a variety of factors, including defects in RF connections, contaminated surfaces, among other possible issues that may result in additional unwanted frequencies in the communication. By monitoring the distortion, a wireless communication system may be able to change the carrier aggregation based on the specific needs of each wireless communication device. Thus, if a communication with a device includes a greater amount of intermodulation distortion, then the system may use a different form of carrier aggregation to account for this issue.

While the wireless communication system monitors for intermodulation distortion, a wireless communication device may have a communication service request (402). Such a request may include a VoLTE communication, a request to send data from an application on the wireless communication device, a request to receive data for an application on the wireless communication device, among other possible requests. Once the request is detected, the wireless communication system determines if the service request comprises a VoLTE communication request. If the request is a VoLTE request, the system will schedule the wireless communication device to use intra-band contiguous carrier aggregation (403).

If, however, the request is not a VoLTE request, the system will then determine if the intermodulation distortion is greater than a certain threshold. This threshold may be a percentage, a specific value, a value in decibels, or any other type of threshold that may be used with intermodulation distortion. Further, the threshold may be set by a computer module within the scheduler, may be determined by an administrator of the wireless communication system, or may be determined by any other method. In situations where the intermodulation distortion for the communication with the wireless device is less than the threshold value, the scheduler will schedule the wireless communication device to use intra-band non-contiguous carrier aggregation (404). In contrast, if the intermodulation distortion is greater than the threshold, the scheduler will schedule the wireless communication device to use inter-band non-contiguous carrier aggregation (405). By switching the communication to inter-band non-contiguous carrier aggregation, this allows the communication signals to further separate themselves in the wireless spectrum. As a result, the communication has a greater chance of diminishing the amount of interference between the communications at the different frequencies.

Figure 5:
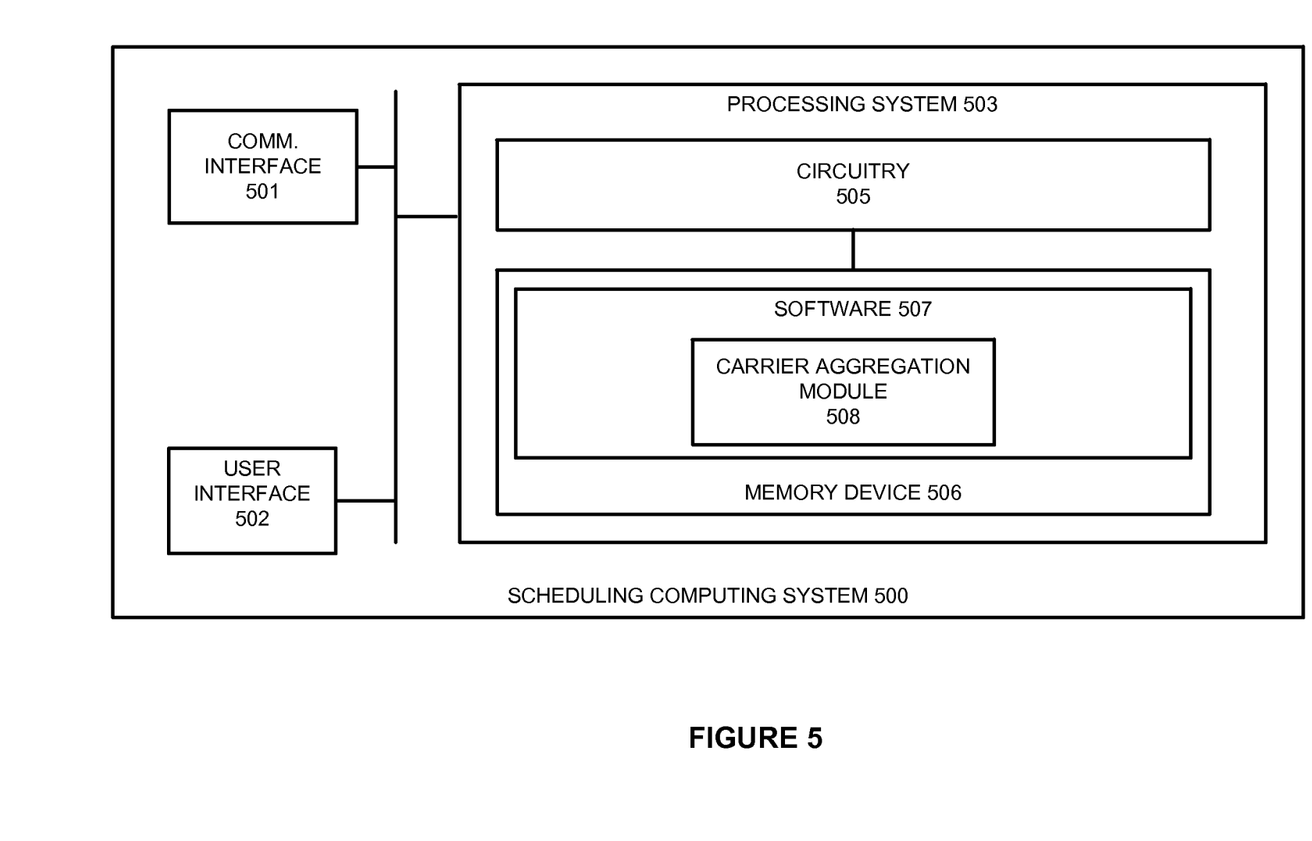
FIG. 5 illustrates a scheduling computing system for controlling carrier aggregation.

FIG. 5 illustrates a scheduling computing system 500 for carrier aggregation. Scheduling computing system 500 is an example of scheduler 104, although scheduler 104 may use alternative configurations. Scheduling computing system 500 includes communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof. In some examples, communication interface 501 may be configured to communicate with an LTE base station or eNodeB. This communication may be used to monitor for intermodulation distortion in orthogonal frequency division multiplexing, as well as identifying indications of a communication service request. In some instances, rather than communicating with the LTE base station, scheduling computing system 500 may reside on the base station. As a result, communication interface 501 may be the same as the communication interface for the base station, and may be used to communicate with the wireless communication device using LTE communication format.

User interface 502 includes components that interact with a user. User interface 502 may include a keyboard, display screen, mouse, touch pad, or some other user input/output apparatus. In some examples, user interface 502 may be used to configure the threshold value for the intermodulation distortion, or configure other aspects of scheduling computing system 500. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 may include an operating system, utilities, drivers, network interfaces, applications, or some other type of software. When executed by circuitry 505, operating software 507 directs processing system 503 to operate scheduling computing system 500 as described herein.

In a particular example, carrier aggregation module 508 in operating software 507 directs processing system 503 to monitor intermodulation distortion in orthogonal frequency division multiplexing frequencies for the frequency bands. These multiplexing frequencies are used to divide up the frequency bands into multiple frequencies for the wireless communication devices. Carrier aggregation module 508 is further configured to receive a communication service request for a wireless communication device. Further, based on the type of communication request and the intermodulation distortion, scheduling computing system 500 is configured to schedule the communication accordingly.

For example, if the request for communication comprises a VoLTE or Voice over LTE communication request, scheduling computing system 500 will schedule the wireless communication device to use intra-band contiguous carrier aggregation. In contrast, if the communication is not a VoLTE request, carrier aggregation module 508 may then determine if the intermodulation distortion is over a certain threshold, which may be defined in decibels or any other distortion value. This threshold may be defined by a system administrator, a software module on scheduling computing system 500, or by any other method. If the intermodulation distortion is found to be below the threshold, then scheduling computing system 500 will schedule the wireless communication device to use intra-band non-contiguous carrier aggregation. However, if the intermodulation distortion is above the threshold value, then scheduling computing system 500 will schedule the wireless communication device to use inter-band non-contiguous carrier aggregation. As a result, by using inter-band communication, the wireless device has a lesser chance of distortion in the communication.

Although illustrated with one software module in the present example, it should be understood that scheduling computing system 500 may be implemented using one or more software modules. Further, although illustrated as a separate computing system, it should be understood that scheduling computing system 500 may be implemented wholly or partially on a wireless base station that communicates with the wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system that uses multiple frequency bands to control carrier aggregation, the method comprising:
    monitoring intermodulation distortion in orthogonal frequency division multiplexing frequencies in the multiple frequency bands;
    receiving a communication service request for a wireless communication device;
    if the communication service request is Voice over Long Term Evolution (VoLTE), scheduling the wireless communication device to use intra-band contiguous carrier aggregation;
    if the communication service request is not VoLTE, and the intermodulation distortion is below a distortion threshold, scheduling the wireless communication device to use intra-band non-contiguous carrier aggregation; and
    if the communication service request is not VoLTE, and the intermodulation distortion is above the distortion threshold, scheduling the wireless communication device to use inter-band non-contiguous carrier aggregation.

2. The method of claim 1, wherein the multiple frequency bands comprise Long Term Evolution (LTE) frequency bands.

3. The method of claim 1, wherein the multiple frequency bands comprise two frequency bands.

4. The method of claim 1, wherein the orthogonal frequency division multiplexing frequencies divide the multiple frequency bands.

5. The method of claim 1, wherein the communication service request that is not VoLTE comprises a data request for an application on the wireless communication device.

6. The method of claim 1, wherein the communication service request is initiated by the wireless communication device.

7. The method of claim 1, wherein the communication service request is initiated by another wireless communication device.

8. The method of claim 1, wherein the communication service request is initiated by serving computing device.

9. The method of claim 1, wherein the distortion threshold comprises a predetermined numerical value.

10. The method of claim 9, wherein the predetermined numerical value comprises a decibel value.

11. A computer apparatus to facilitate carrier aggregation, the computer apparatus comprising:
    a processor; and
    one or more non-transitory computer readable media coupled to the processor storing instructions that when executed by the processor cause the apparatus to:
        monitor intermodulation distortion in orthogonal frequency division multiplexing frequencies in multiple frequency bands;
        receive a communication service request for a wireless communication device;
        if the communication service request is Voice over Long Term Evolution (VoLTE), schedule the wireless communication device to use intra-band contiguous carrier aggregation;
        if the communication service request is not VoLTE, and the intermodulation distortion is below a distortion threshold, schedule the wireless communication device to use intra-band non-contiguous carrier aggregation; and
        if the communication service request is not VoLTE, and the intermodulation distortion is above the distortion threshold, schedule the wireless communication device to use inter-band non-contiguous carrier aggregation.

12. The computer apparatus of claim 11, wherein the multiple frequency bands comprise Long Term Evolution (LTE) frequency bands.

13. The computer apparatus of claim 11, wherein the multiple frequency bands comprise two frequency bands.

14. The computer apparatus of claim 11, wherein the orthogonal frequency division multiplexing frequencies divide the multiple frequency bands.

15. The computer apparatus of claim 11, wherein the communication service request that is not VoLTE comprises a data request for an application on the wireless communication device.

16. The computer apparatus of claim 11, wherein the communication service request is initiated by the wireless communication device.

17. The computer apparatus of claim 11, wherein the communication service request is initiated by another wireless communication device.

18. The computer apparatus of claim 11, wherein the communication service request is initiated by serving computing device.

19. The computer apparatus of claim 11, wherein the distortion threshold comprises a predetermined numerical value.

20. The computer apparatus of claim 19, wherein the predetermined numerical value comprises a decibel value.

* * * * *